US010532608B2

(12) United States Patent
Jaeger et al.

(10) Patent No.: US 10,532,608 B2
(45) Date of Patent: Jan. 14, 2020

(54) WHEEL FOR A MOTORCYCLE OR A MOTOR SCOOTER

(71) Applicant: Bayerische Motoren Werke Aktiengesellschaft, Munich (DE)

(72) Inventors: Elmar Jaeger, Kempten im Allgaeu (DE); Bernd Kassner, Markt Indersdorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 252 days.

(21) Appl. No.: 15/624,313

(22) Filed: Jun. 15, 2017

(65) Prior Publication Data

US 2017/0282640 A1   Oct. 5, 2017

Related U.S. Application Data

(63) Continuation of application No. PCT/EP2015/075766, filed on Nov. 5, 2015.

(30) Foreign Application Priority Data

Dec. 17, 2014  (DE) .......................... 10 2014 226 147

(51) Int. Cl.
*B60B 5/02* (2006.01)
*B60B 27/00* (2006.01)
(Continued)

(52) U.S. Cl.
CPC ................. *B60B 5/02* (2013.01); *B60B 3/14* (2013.01); *B60B 27/0015* (2013.01);
(Continued)

(58) Field of Classification Search
CPC ... B60B 5/02; B60B 27/0015; B60B 27/0052; B60B 3/14; B60B 27/02;
(Continued)

(56) References Cited

U.S. PATENT DOCUMENTS 3,917,352 A * 11/1975 Gageby ................. B29C 70/24
301/64.702
4,017,348 A    4/1977 Shumaker
(Continued)

FOREIGN PATENT DOCUMENTS

DE  199 16 444 A1  10/2000
DE  101 20 203 A1  10/2002
(Continued)

OTHER PUBLICATIONS

Japanese-language Office Action issued in counterpart Japanese Application No. 2017-531514 dated May 30, 2018 with partial English translation (four (4) pages).
(Continued)

*Primary Examiner* — S. Joseph Morano
*Assistant Examiner* — Jean W Charleston
(74) *Attorney, Agent, or Firm* — Crowell & Moring LLP

(57) ABSTRACT

The invention relates to a wheel for a powered two-wheeler, in particular a motorcycle or a motor scooter, that is at least sectionally made of a fiber-reinforced plastic material. A hub area (12) of the wheel (IO) is provided with two rigid, self-supporting, metal inserts (18, 20), which are arranged on axially opposite sides of the hub area (12), and which in an axial and radial direction (A, r) are connected to one another in a form-fit manner.

7 Claims, 2 Drawing Sheets

(51) Int. Cl.
*B60B 27/02* (2006.01)
*B60B 3/14* (2006.01)
(52) U.S. Cl.
CPC .......... *B60B 27/0052* (2013.01); *B60B 27/02* (2013.01); *B60B 27/023* (2013.01); *B60B 2360/10* (2013.01); *B60B 2360/341* (2013.01); *B60B 2360/3416* (2013.01); *B60B 2900/111* (2013.01); *B60B 2900/513* (2013.01); *B60Y 2200/12* (2013.01); *B60Y 2200/126* (2013.01); *B60Y 2200/13* (2013.01)
(58) Field of Classification Search
CPC ....... B60B 2900/111; B60B 2360/3416; B60B 2360/341; B60B 2360/10; B60B 27/023; B60B 2900/513; B60Y 2200/126; B60Y 2200/13; B60Y 2200/12
USPC ..................................................... 301/34.704
See application file for complete search history.

(56) References Cited

U.S. PATENT DOCUMENTS

| | | | | |
|---|---|---|---|---|
| 5,372,407 | A * | 12/1994 | Brown | B60B 27/02 301/110.5 |
| 6,318,810 | B1 * | 11/2001 | Miyake | B60B 27/02 188/218 XL |
| 6,736,464 | B1 | 5/2004 | Pidoux | |
| 6,899,400 | B1 | 5/2005 | Cook | |
| 2002/0084689 | A1 | 7/2002 | Sebode | |
| 2014/0346847 | A1 | 11/2014 | Werner et al. | |
| 2014/0375112 | A1 * | 12/2014 | Werner | B29C 70/34 301/63.109 |

FOREIGN PATENT DOCUMENTS

| | | |
|---|---|---|
| DE | 10 2011 087 938 A1 | 6/2013 |
| JP | 56-75201 A | 6/1981 |
| JP | 6-8701 A | 1/1994 |
| JP | 7-290901 A | 11/1995 |
| JP | 8-502461 A | 3/1996 |
| JP | 2000-289401 A | 10/2000 |
| WO | WO 95/03943 A1 | 2/1995 |
| WO | WO 00/43222 A1 | 7/2000 |

OTHER PUBLICATIONS

Chinese-language Office Action issued in counterpart Chinese Application No. 201580051008.3 dated Jul. 19, 2018 with English translation (13 pages).
International Search Report (PCT/ISA/210) issued in PCT Application No. PCT/EP2015/075766 dated Feb. 9, 2016 with English translation (Four (4) pages).
German-language Written Opinion (PCT/ISA/237) issued in PCT Application No. PCT/EP2015/075766 dated Feb. 9, 2016 with (Five(5) pages).
German-language Search Report issued in counterpart German Application No. 10 2014 226 147.3 dated Sep. 22, 2015 with partial English translation (Thirteen (13) pages).
Cover page of EP 1 150 848 A0 dated Nov. 7, 2001 (One (1) page).
English translation of Chinese Office Action issued in counterpart Chinese Application No. 201580051008.3 dated Mar. 6, 2019 (four pages).
Chinese-language Office Action issued in counterpart Chinese Application No. 201580051008.3 dated Jun. 12, 2019 with English translation (eight (8) pages).

\* cited by examiner

WHEEL FOR A MOTORCYCLE OR A MOTOR SCOOTER

CROSS REFERENCE TO RELATED APPLICATIONS

This application is a continuation of PCT International Application No. PCT/EP2015/075766, filed Nov. 5, 2015, which claims priority under 35 U.S.C. § 119 from German Patent Application No. 10 2014 226 147.3, filed Dec. 17, 2014, the entire disclosures of which are herein expressly incorporated by reference.

BACKGROUND AND SUMMARY OF THE INVENTION

The invention relates to a wheel for a motorcycle or motor scooter, in particular to a rear wheel of a motorcycle or a motor scooter.

For reasons of weight saving, there is an effort to use lighter components in motor vehicles. In recent years, fiber-reinforced plastics increasingly have been used.

This concept is also implemented in motorcycle wheels. Here, rims and spokes can be manufactured completely from fiber-reinforced plastic, in particular from carbon fiber-reinforced plastic. Two metallic inserts have been embedded up to now into the fiber-reinforced plastic on axially opposite sides of the wheel in the hub region to introduce force from a drive sprocket on the one wheel side and from a brake disk on the other wheel side. The two inserts are spaced apart from one another and inserted separately from both sides of the wheel.

The conventionally used fiber-reinforced plastics are designed only for a certain maximum temperature. However, high temperatures can also occur for relatively long times during braking maneuvers precisely at the brake disk-side insert, with the result that additional heat dissipation has to be ensured.

It is an object of the invention to provide a wheel which is as light as possible and as temperature-insensitive as possible.

According to the invention, this is achieved in a wheel for a motorcycle or a motor scooter, which wheel consists at least in sections of a fiber-reinforced plastic, a hub region of the wheel having two rigid, self-supporting, metallic inserts which are arranged on axially opposite sides of the hub region and which are connected to one another in a positively locking manner in the axial and radial direction.

Due to the positively locking connection of the two inserts, a rapid transfer of thermal energy also takes place in the axial direction from the brake disk-side insert to the opposite side of the wheel to the second insert. This results in an improved distribution of the thermal energy, and the additional surface area of the second insert, moreover, results in an improved dissipation of the thermal energy. As a result of the transfer of heat to the second insert, more uniform heating of the hub region of the wheel also takes place, with the result that more uniform loading of the fiber-reinforced plastic sections as a result of the action of heat occurs.

In addition, the positively locking engagement of the two inserts which lie on opposite sides of the wheel ensures a coaxial orientation of the force introduction points of both inserts with regard to the wheel axis and therefore a correct orientation of the entire hub region in a simple way. The force introduction points can be formed, for example, by way of openings in the respective insert.

As in the case of known wheels, one of the inserts is designed for fastening a brake disk and/or the other insert is designed for fastening a drive sprocket. The fastening of the drive sprocket and/or brake disk can take place via the openings in the inserts. The invention can be used both in rear wheels and in front wheels, it not being necessary for a drive sprocket to be provided in the case of the use as a front wheel.

The two inserts can be connected to the surrounding fiber composite of the fiber-reinforced plastic sections of the wheel, for example, by way of being pressed in, adhesively bonded or laminated in, it additionally optionally being possible for the plastic to also engage into recesses on the insert.

The fiber-reinforced plastic is, for example, a carbon fiber-reinforced plastic (CRP). It goes without saying that other suitable fibers can also be used for reinforcement.

With the exception of the inserts and of course a tire, the wheel can consist substantially completely of fiber-reinforced plastic. Further metallic constituent parts next to the two inserts are normally not provided in the hub region.

The sections of the two inserts which form the axial positively locking connection preferably lie substantially in the axial center of the two inserts.

In order to form the positively locking connection, at least one of the inserts can have at least one circumferential, axially extending limb which, at its free end, bears against a bearing section of the other insert.

A shoulder which produces an axial and a radial stop is configured, for example, at the free end of the limb and/or on the bearing section, with the result that, when the inserts bear against one another, a positively locking connection is produced in the axial and radial direction. During the assembly of the inserts during the manufacture of the wheel, the inserts thus assume their correct final assembly position in the axial and radial direction in a simple way. Here, centering of the force introduction points of both inserts is also ensured automatically.

In one preferred embodiment, each insert has two circumferential, coaxial, axially extending limbs, a bearing section being configured on each of the pairs of limbs which lie opposite one another, in each case on one of the limbs. In one possible variant, both bearing sections are provided on the same insert.

Each of the bearing sections can have a shoulder, the shoulders of the two bearing sections preferably being of mirror-symmetrical configuration with regard to the radial direction, in order to achieve secure fixing in the radial direction. In this case, the free ends of the limbs of the one insert are pushed, for example, onto the bearing sections in such a way that the free ends engage around them radially. Using a geometry of this type, both the radial and the axial positively locking connection can be produced simply by way of the two inserts being pushed together axially.

The ends which lie opposite the free ends of the limbs are preferably connected in each insert via an annular disk which extends, for example, perpendicularly with respect to the axial direction.

In the region of the positively locking connection, the two inserts do not have to be connected fixedly to one another, but rather can be held in their position via the embedding into the sections of the wheel made from fiber-reinforced plastic.

A positively locking and non-positive connection is preferably also formed in the circumferential direction between the two inserts. This has the advantage that acceleration forces, both during the increase in the vehicle speed via the drive sprocket and during the retardation of the two-wheeled vehicle via the brake disk, are always transmitted uniformly to both inserts, which increases the stability of the overall wheel. Here, the positively locking and non-positive connection in the circumferential direction ensures a uniform introduction of force into the overall hub region of the wheel.

In order to produce the positively locking and non-positive connection in the circumferential direction, complementary toothing systems which engage into one another can be configured, for example, on at least one radial outer side of one of the inserts and on at least one radial inner side of the other insert. The toothing systems are preferably provided in each case at all free ends of the limbs and on all bearing sections of both inserts which engage into one another for the axial positively locking connection.

Both inserts advantageously together enclose a toroidal cavity, both in order to save weight and also in order to increase the stability of the wheel. The cavity can be configured between the limbs which run in the axial direction and the annular disks of the two inserts.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
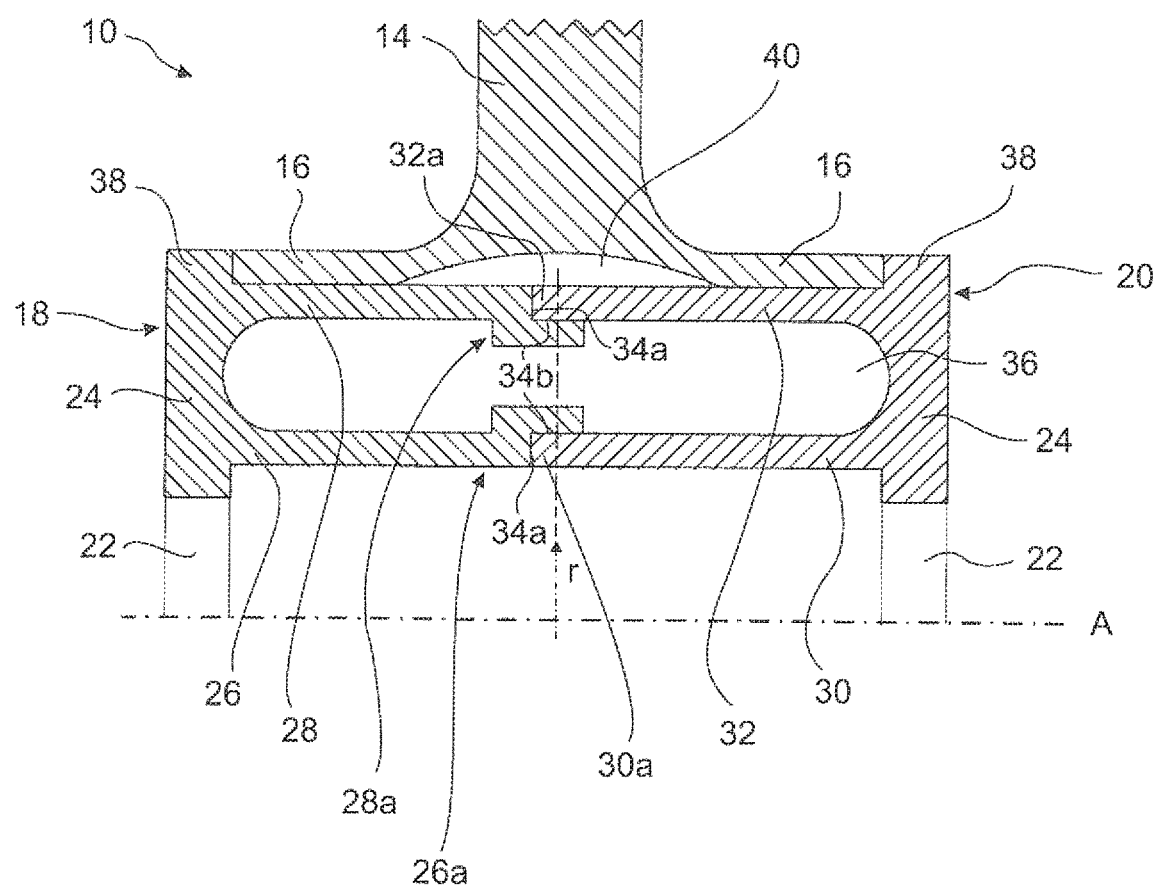
FIG. 1 shows a diagrammatic sectional view of a detail of an embodiment of a wheel according to the invention, perpendicularly with respect to the circumferential direction.

FIG. 1 shows a detail of a wheel 10 of a motorcycle or motor scooter in a section through its axis A, perpendicularly with respect to the circumferential direction U.

The wheel 10 has a radially inner hub region 12 and a wheel rim which surrounds the hub region 12 radially on the outside and of which merely a spoke 14 which connects the hub region 12 and a rim is indicated in FIG. 1.

Here, both the spokes 14 and the rim consist as far as possible of a fiber-reinforced plastic, for example a fiber composite with carbon fibers and a suitable polymer.

A section 16 which runs around circumferentially and is made from fiber-reinforced plastic starts radially on the outside of the hub region 12, which section 16 merges along the circumference in one piece into a plurality of spokes 14.

Two rigid, self-supporting, metallic inserts 18, 20 are arranged in the radial center of the hub region 12, which inserts 18, 20 are accessible axially from the outside on opposite sides of the wheel 10.

Both inserts 18, 20 in each case have a central through opening 22, by which the wheel 10 can be mounted on an axle of the two-wheeled vehicle, and a plurality of openings (not shown), via which a drive sprocket is fastened to one of the inserts on one side of the wheel 10 and a brake disk is fastened to the other insert on the other side of the wheel 10 (not shown).

The two inserts 18, 20 are connected to one another in a positively locking manner in the axial direction A and the radial direction r.

In the embodiment which is shown, both inserts 18, 20 are shaped similarly. Each of the inserts 18, 20 has the shape of a U-profile which runs around circumferentially, the closed side of the U being formed by way of an annular disk 24 which points outward in the wheel 10 and also has the openings. The annular disks 24 of both inserts 18, 20 can be shaped substantially identically.

In the case of both inserts 18, 20, the limbs 26, 28, 30, 32 of the U-profile run for the large part along the axial direction A, the limbs 26, 28 of the first insert 18 and the limbs 30, 32 of the second insert 20 in each case being arranged coaxially with respect to one another.

The free ends 30a, 32a of the limbs 30, 32 of the second insert 20 come into contact in the axial direction A with bearing sections 26a, 28a at the free ends of the limbs 26, 28 of the first insert 18.

The bearing sections 26a, 28a are configured in each case in the form of a shoulder which defines a radially running region 34a, against which the respective free end 30a, 32a of the limbs 30, 32 of the second insert 20 bears in the axial direction A. Moreover, each shoulder defines an axially running region 34b, formed here by way of a radially offset free end of the limb 26, 28 of the first insert 18, against which region 34b the free end 30a, 32a bears in the radial direction r. The shoulder therefore forms a stop in the axial direction A and in the radial direction r for the associated free end 30a, 32a of the limb 30, 32.

The axially running regions 34b of the two bearing sections 26a, 28a are arranged mirror-symmetrically with regard to the radial direction r here, with the result that they lie radially within the free ends 30a, 32a of the limbs 30, 32. When the two inserts 18, 20 are pushed together along the axial direction A, a positively locking connection is thus achieved both in the axial direction A and in the radial direction r.

The point at which the positively locking connection between the two inserts 18, 20 is formed lies approximately centrally between the two annular disks 24 of the two inserts 18, 20 in the axial center M of the two inserts 18, 20.

In their interior, the two inserts 18, 20 enclose an annular cavity 36 which is filled with air here. As a result of the contact of the free ends 30a, 32a of the limbs 30, 32 on the bearing sections 26a, 28a, the cavity 26 is closed to the outside in a sealed manner.

The limbs 26, 30 and the limbs 28, 32 come into contact with one another in a flush manner on the radial outer side and the radial inner side of the two inserts 18, 20, with the result that no edge is formed in the axial direction A.

In this example, each of the inserts 18, 20 has a circumferential, radially outwardly directed projection 38, on which the annular disk 24 projects radially beyond the limbs 26, 28 and 30, 32 and which is adjoined in a flush manner in each case by the section 16 made from fiber-reinforced plastic. A cavity 40 is formed, however, in the region above the positively locking connection of the two inserts 18, 20, in which cavity 40 the fiber-reinforced plastic is spaced apart slightly from the inserts 18, 20.

Figure 2:
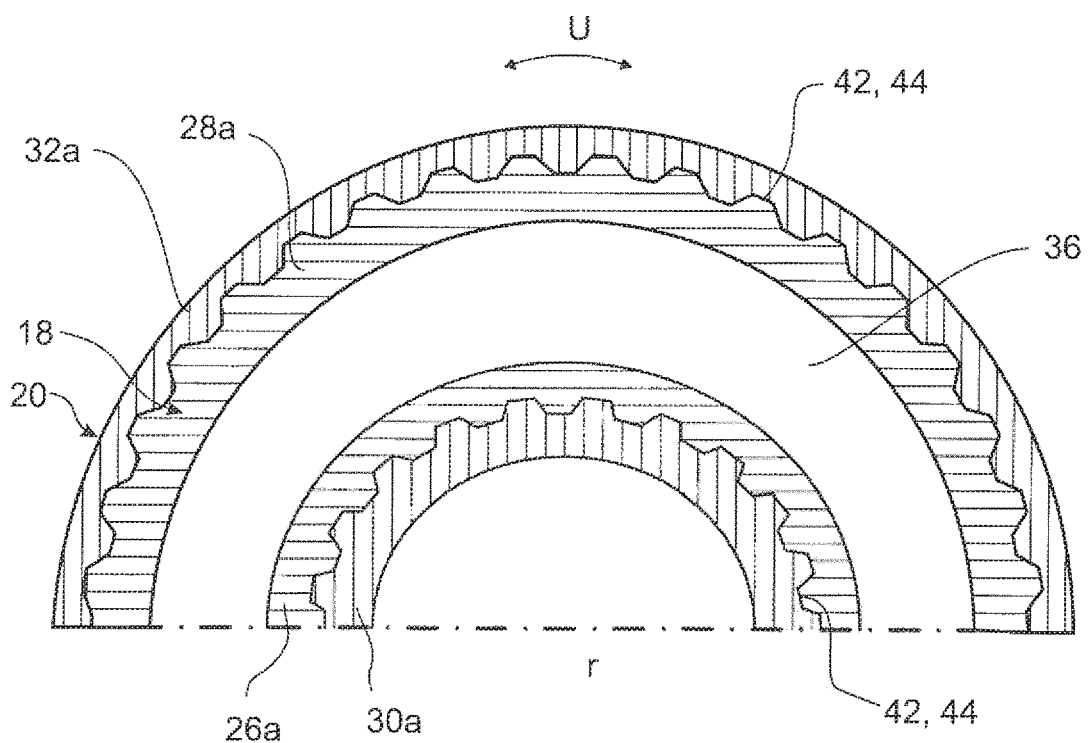
FIG. 2 shows a diagrammatic sectional view of the two inserts of the wheel from FIG. 1, perpendicularly with respect to the axial direction.

Both a positively locking connection and a non-positive connection are formed in the circumferential direction U between the two inserts 18, 20 (see FIG. 2).

To this end, in each case one toothing system 42, 44 is configured radially on the axially running regions 34b of the bearing sections 26a, 28a and on those sections of the free ends 30a, 32a of the limbs 30, 32 which bear against said regions 34b, the toothing systems 42, 44 on the two inserts 18, 20 engaging into one another without play in a complementary manner. It would also be possible to provide toothing systems only on one pair of limbs.

In this way, a force which acts in the circumferential direction U on one of the inserts 18, 20 is also transmitted directly and immediately to the other insert 20, 18, and forces during acceleration and braking are distributed uniformly in the hub region 12.

During the manufacture of the wheel 10, the two inserts 18, 20 are pushed into one another in the axial direction A before the connection to the fiber-reinforced plastic sections 16, with the result that both the axial and radial and positively locking connection in the circumferential direction are produced by way of the engagement of the free ends 30a, 32a of the limbs 30, 32 with the bearing sections 26a, 28a on the limbs 26, 28 and the simultaneous engagement of the toothing systems 42, 44.

When the two inserts 18, 20 are plugged into one another, the axially running regions 34b of the bearing sections 26, 28a of the first insert 18 serve as a guide for the free ends 30a, 32a of the limbs 30, 32 of the second insert 20.

The inserts 18, 20 are then connected fixedly to the sections 16 of the hub region 12 made from the fiber-reinforced plastic, in each case in a region close to the outer sides of the inserts 18, 20. This connection can take place, for example, by way of laminating in, adhesive bonding or pressing in.

The positively locking connection of the two inserts 18, 20 provides a satisfactory transfer of heat from one insert to the other, in particular from that insert, to which the brake disk is fastened. The distribution of the thermal energy to the overall hub region 12 prevents a buildup of heat and reduces the maximum temperature. Moreover, a transmission of force between the inserts 18, 20 always takes place on account of the positively locking connection in the circumferential direction, both in the case of an introduction of force by way of the drive sprocket and in the case of an introduction of force by way of the brake disk, with the result that the wheel 10 is always loaded uniformly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel for a motorcycle or a motor scooter, comprising:
    a wheel body formed at least in sections of a fiber-reinforced plastic;
    self-supporting metallic inserts arranged at a hub region of the wheel body on axially opposite sides of the hub region,
    wherein
        the inserts are connected to one another in a positively locking manner in axial and radial directions of the wheel,
        each insert has circumferential, coaxial, axially extending limbs,
        when in an installed position in the hub region, at least one axially-opposed pair of the axially extending limbs includes a bearing section on one of the axially-opposed limbs of the pair,
        a positively locking and non-positive connection is formed in the circumferential direction between the inserts,
        each axially-extending limb of at least one pair of the axially-opposed pairs of the axially extending limbs includes complementary teeth,
        the teeth on one of the axially-extending limbs of the at least one pair are arranged on a radial outer side and the teeth on the other of the axially-extending limbs of the at least one pair are arranged on a radial inner side, and
        the radial outer teeth and the radial inner teeth axially overlap one another.

2. The wheel as claimed in claim 1, wherein at least one of the inserts is configured for connecting to a drive sprocket and another one of the inserts is configured for connecting to a brake disk.

3. The wheel as claimed in claim 1, wherein the fiber-reinforced plastic is a carbon fiber-reinforced plastic.

4. The wheel as claimed in claim 3, wherein a region at which the axial positively locking connection of the inserts is made is substantially in an axial center of the connected inserts.

5. The wheel as claimed in claim 3, wherein at least one of the inserts has at least one circumferential, axially extending limb which at its free end is configured to bear against a bearing section of another one of the inserts.

6. The wheel as claimed in claim 5, wherein a shoulder configured as an axial and radial stop is located at the free end of the limb or on the bearing section.

7. The wheel as claimed in claim 1, wherein the axially-extending limbs cooperate to enclose a toroidal cavity.

* * * * *